United States Patent
Hirokawa

(10) Patent No.: US 12,046,029 B2
(45) Date of Patent: Jul. 23, 2024

(54) INFORMATION PROCESSING DEVICE, INFORMATION PROCESSING METHOD, AND STORAGE MEDIUM

(71) Applicant: NEC Corporation, Tokyo (JP)

(72) Inventor: Akira Hirokawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 18/273,462

(22) PCT Filed: Jan. 12, 2022

(86) PCT No.: PCT/JP2022/000665
§ 371 (c)(1),
(2) Date: Jul. 20, 2023

(87) PCT Pub. No.: WO2022/158345
PCT Pub. Date: Jul. 28, 2022

(65) Prior Publication Data
US 2024/0096088 A1    Mar. 21, 2024

(30) Foreign Application Priority Data
Jan. 22, 2021  (JP) .................................. 2021-008538

(51) Int. Cl.
*G06V 10/98*  (2022.01)
*G06V 40/12*  (2022.01)

(52) U.S. Cl.
CPC ........ *G06V 10/993* (2022.01); *G06V 40/1359* (2022.01); *G06V 40/1376* (2022.01)

(58) Field of Classification Search
CPC ............. G06V 10/993; G06V 40/1359; G06V 40/1376
See application file for complete search history.

(56) References Cited

U.S. PATENT DOCUMENTS

| 2006/0002595 | A1 | 1/2006 | Hara et al. | |
| 2014/0226879 | A1* | 8/2014 | Westerman | G06V 40/12 382/125 |
| 2014/0270404 | A1* | 9/2014 | Hanna | G06V 40/45 382/116 |
| 2017/0039409 | A1* | 2/2017 | Han | G06F 3/0421 |
| 2019/0340411 | A1 | 11/2019 | Lu | |

(Continued)

FOREIGN PATENT DOCUMENTS

| JP | 2000-020693 A | 1/2000 |
| JP | 2002-279413 A | 9/2002 |
| JP | 2004-078433 A | 3/2004 |

(Continued)

OTHER PUBLICATIONS

International Search Report for PCT Application No. PCT/JP2022/000665, mailed on Apr. 12, 2022.

(Continued)

*Primary Examiner* — Antonio Xavier
(74) *Attorney, Agent, or Firm* — Sughrue Mion, PLLC

(57) ABSTRACT

An information processing device includes an extraction unit that extracts a core line from an image containing dermatoglyphic pattern; an identification unit that identifies an evaluation value indicating possibility of the dermatoglyphic pattern of the core line; and a correction unit that corrects the image based on the evaluation value.

8 Claims, 29 Drawing Sheets

(56) References Cited

U.S. PATENT DOCUMENTS

2021/0272125 A1* 9/2021 Kopf .................. G06F 16/2255

FOREIGN PATENT DOCUMENTS

| | | |
|---|---|---|
| JP | 2004-078434 A | 3/2004 |
| JP | 2005-352623 A | 12/2005 |
| JP | 2006-018731 A | 1/2006 |
| JP | 2012-088918 A | 5/2012 |
| JP | 2013-210902 A | 10/2013 |
| JP | 2014-099024 A | 5/2014 |
| JP | 2014-099039 A | 5/2014 |
| JP | 2019-045924 A | 3/2019 |
| JP | 2019-191913 A | 10/2019 |
| JP | 2020-077291 A | 5/2020 |

OTHER PUBLICATIONS

Miyuki Miki et al., "Evaluation of Thinning Algorithms for Fingerprint Identification", IEICE Technical Report, Oct. 2, 1997 (received date), pp. 1-6.

JP Office Action for JP Application No. 2022-576617, mailed on May 16, 2024 with English Translation.

* cited by examiner

FIG. 9
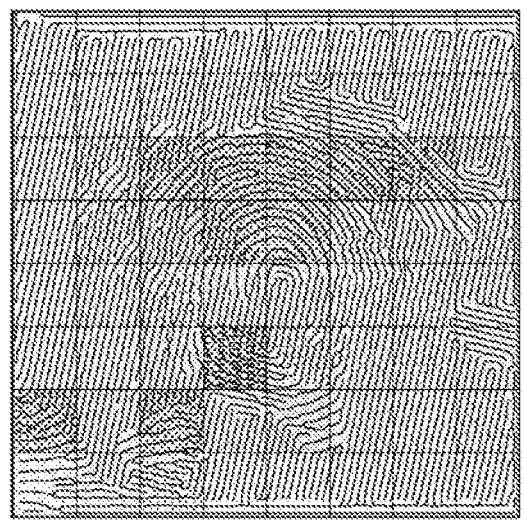
Size of compressed data
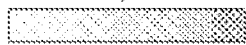
Small                Large

INFORMATION PROCESSING DEVICE, INFORMATION PROCESSING METHOD, AND STORAGE MEDIUM

This application is a National Stage Entry of PCT/JP2022/000665 filed on Jan. 12, 2022, which claims priority from Japanese Patent Application 2021-008538 filed on Jan. 22, 2021, the contents of all of which are incorporated herein by reference, in their entirety.

TECHNICAL FIELD

This disclosure relates to an information processing device, an information processing method, and a storage medium.

BACKGROUND ART

Patent Literature 1 discloses a fingerprint image synthesizing device that generates a composite fingerprint image using two types of images, a rolled fingerprint and a slap fingerprint. The fingerprint image synthesizing device is equipped with a function to extract core lines from the image. The fingerprint image synthesizing device matches a core line of the rolled fingerprint with a core line of the slap fingerprint and thereby generates corresponding point data indicating the correspondence between the core line of the rolled impression and the core line of the flat impression.

CITATION LIST

Patent Literature

PTL 1: Japanese Patent Laid-Open No. 2006-018731

SUMMARY OF INVENTION

Technical Problem

In the process, as exemplified in Patent Literature 1, of extracting core lines from an image containing dermatoglyphic pattern, if the background area of an image contains periodic shapes, patterns, or the like, the area may be incorrectly recognized as a ridge. In such a case, core lines cannot be properly extracted from the image, and the accuracy of a matching process decreases.

In view of the above problems, the purpose of the disclosure is to provide an information processing device, an information processing method, and a storage medium that can improve the accuracy of the matching process of dermatoglyphic pattern.

Solution to Problem

According to one example aspect of the disclosure, provided is an information processing device including: an extraction unit that extracts a core line from an image containing dermatoglyphic pattern; an identification unit that identifies an evaluation value indicating possibility of the dermatoglyphic pattern of the core line; and a correction unit that corrects the image based on the evaluation value.

According to another example aspect of the disclosure, provided is an information processing device including: an extraction unit that extracts a core line from an image containing dermatoglyphic pattern; and an identification unit that identifies an evaluation value indicating possibility of the dermatoglyphic pattern of the core line based on data size of compressed data of the image.

According to yet another example aspect of the disclosure, provided is an information processing method including: extracting a core line from an image containing dermatoglyphic pattern; identifying an evaluation value indicating possibility of the dermatoglyphic pattern of the core line; and correcting the image based on the evaluation value.

According to yet another example aspect of the disclosure, provided is a storage medium storing a program that causes a computer to perform: extracting a core line from an image containing dermatoglyphic pattern; identifying an evaluation value indicating possibility of the dermatoglyphic pattern of the core line; and correcting the image based on the evaluation value.

BRIEF DESCRIPTION OF DRAWINGS

FIG. 9 is a diagram illustrating an example of compressed data generated for each local area by the image processing device according to the second example embodiment.

DESCRIPTION OF EMBODIMENTS

Figure 1:
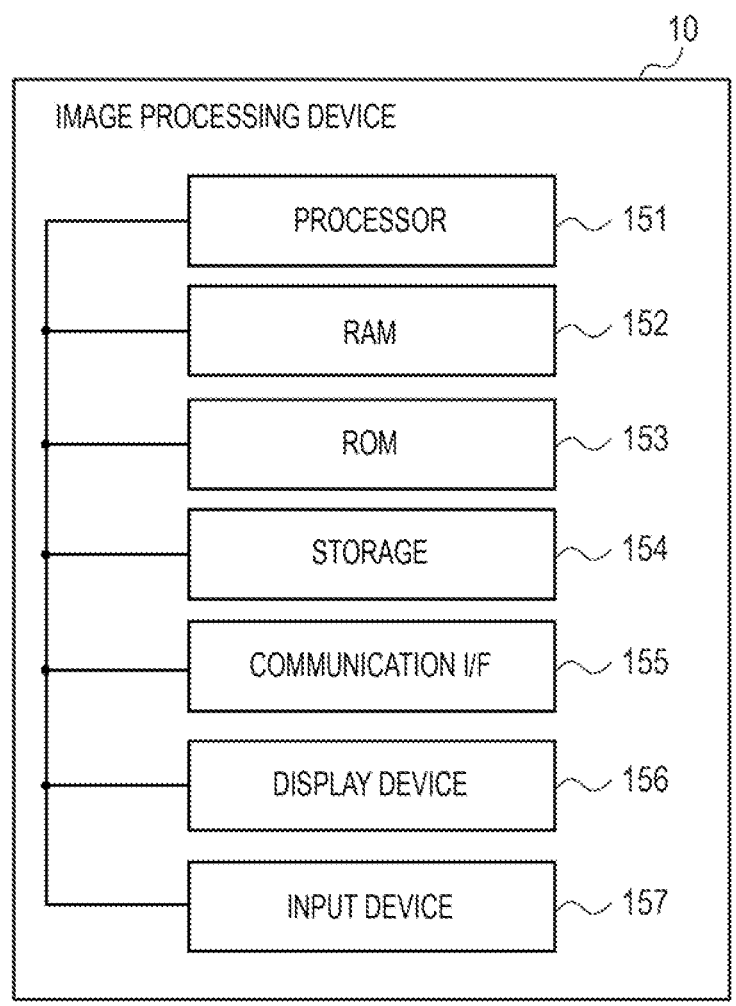
FIG. 1 is a block diagram illustrating a hardware configuration example of an image processing device according to a first example embodiment.

Exemplary example embodiments of the present disclosure will be described below with reference to the drawings. In the drawings, similar elements or corresponding elements are labeled with the same reference, and the description thereof may be omitted or simplified.

First Example Embodiment

An image processing device 10 according to the present example embodiment will be described with reference to FIG. 1 to FIG. 7. The image processing device 10 of the present example embodiment performs, as preprocessing for fingerprint matching, extraction processing of a core line from a fingerprint image taken in advance for the fingerprint matching and correction processing on the fingerprint image. The extracted core line is used for the extraction of feature points such as endpoints and branch points. By matching feature points with each other between a plurality of fingerprint images, it is possible to perform fingerprint matching to determine whether or not fingerprint images to be matched are those of the same person.

The image processing device 10 is not limited only to extracting core lines from fingerprint images and correcting fingerprint images, but can also be applied to images containing dermatoglyphic pattern other than fingerprints. Dermatoglyphic pattern can include a pattern of raised skin at any part such as fingerprints, palmprints, footprints, or the like.

Among biometric matching using dermatoglyphic pattern, fingerprint matching using fingerprints is widely used. When extracting the feature point from fingerprint images, core lines are often extracted. Therefore, it is most suitable that the image processing device 10 of this embodiment is applied to core line extraction from fingerprint images. Therefore, in the following explanation, it is assumed that the image processing device 10 is adapted for core line extraction from fingerprint images and fingerprint image correction.

FIG. 1 is a block diagram illustrating a hardware configuration example of the image processing device 10. The image processing device 10 may be, for example, a computer such as a desktop personal computer (PC), a note PC, a tablet PC, or the like.

The image processing device 10 includes a processor 151, a random access memory (RAM) 152, a read only memory (ROM) 153, a storage 154, a communication interface (I/F) 155, a display device 156, and an input device 157 as a computer that performs calculation, control, and storage. These devices are connected to each other via a bus, a wiring, a drive device, or the like.

The processor 151 has a function of performing predetermined calculation in accordance with a program stored in the ROM 153, the storage 154, or the like and controlling respective units of the image processing device 10. Further, a central processing unit (CPU), a graphics processing unit (GPU), a field programmable gate array (FPGA), a digital signal processor (DSP), an application specific integrated circuit (ASIC), or the like may be used as the processor 151. One of the above examples may be used, or several of the above examples may be used in parallel.

The RAM 152 is formed of a volatile storage medium and provides a temporary memory area required for operations of the processor 151. The ROM 153 is formed of a nonvolatile storage medium and stores necessary information such as a program used in operations of the image processing device 10.

The storage 154 is formed of a nonvolatile storage medium and stores a database, stores an operating program of the image processing device 10, or the like. The storage 154 is formed of a hard disk drive (HDD) or a solid state drive (SSD), for example.

The communication I/F 155 is a communication interface based on a specification such as Ethernet (registered trademark), Wi-Fi (registered trademark), 4G, 5G, or the like and is a module used for communicating with other devices.

The display device 156 is a liquid crystal display, an organic light emitting diode (OLED) display, or the like configured to display a moving image, a still image, a text, or the like and is used for presenting information to the user.

The input device 157 is a keyboard, a pointing device, a button, or the like and accepts a user operation. The display device 156 and the input device 157 may be integrally formed as a touch panel.

Note that the hardware configuration illustrated in FIG. 1 is an example, a device other than the above may be added, or some of the devices may not be provided. Further, some of the devices may be replaced with another device having a similar function. Further, some of the functions of the present example embodiment may be provided by another device via a network, or the functions of the present example embodiment may be distributed to and implemented by a plurality of devices. As discussed above, the hardware configuration illustrated in FIG. 1 may be changed as appropriate.

Figure 2:
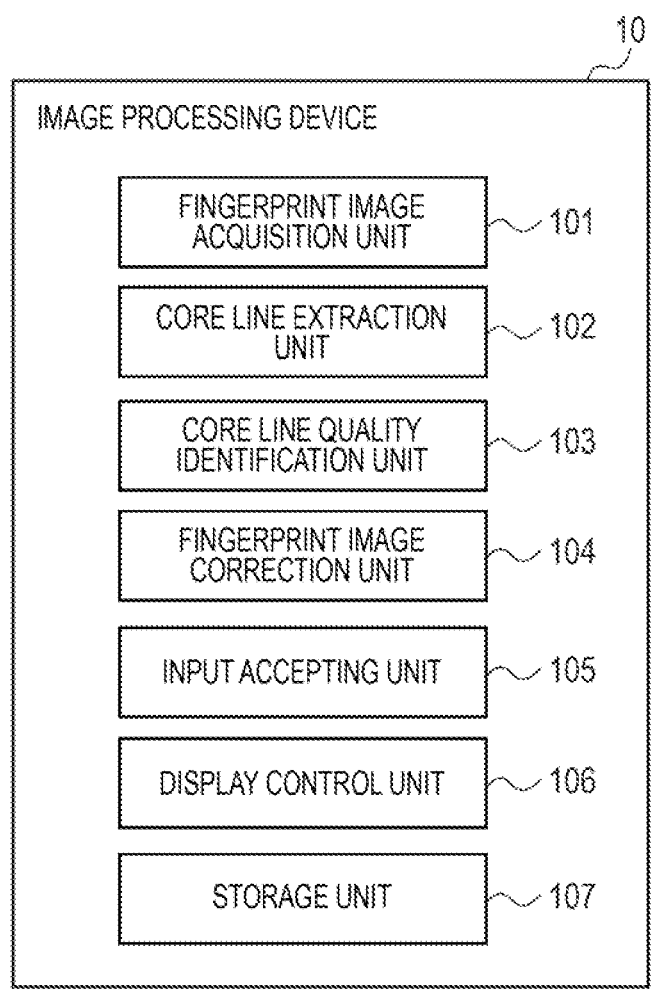
FIG. 2 is a function block diagram of the image processing device according to the first example embodiment.

FIG. 2 is a function block diagram of the image processing device 10 according to the present example embodiment. The image processing device 10 has a fingerprint image acquisition unit 101, a core line extraction unit 102, a core line quality identification unit 103, a fingerprint image correction unit 104, an input accepting unit 105, a display control unit 106, and a storage unit 107.

The processor 151 loads a program stored in the ROM 153, the storage 154, or the like into the RAM 152 and executes the program. Accordingly, the processor 151 implements functions of the fingerprint image acquisition unit 101, the core line extraction unit 102, the core line quality identification unit 103, the fingerprint image correction unit 104, and the display control unit 106. The process performed by these units will be described later. The processor 151 controls the input device 157 and thereby implements the function of the input accepting unit 105. The processor 151 controls the storage 154 and thereby implements the function of the storage unit 107.

Figure 3:
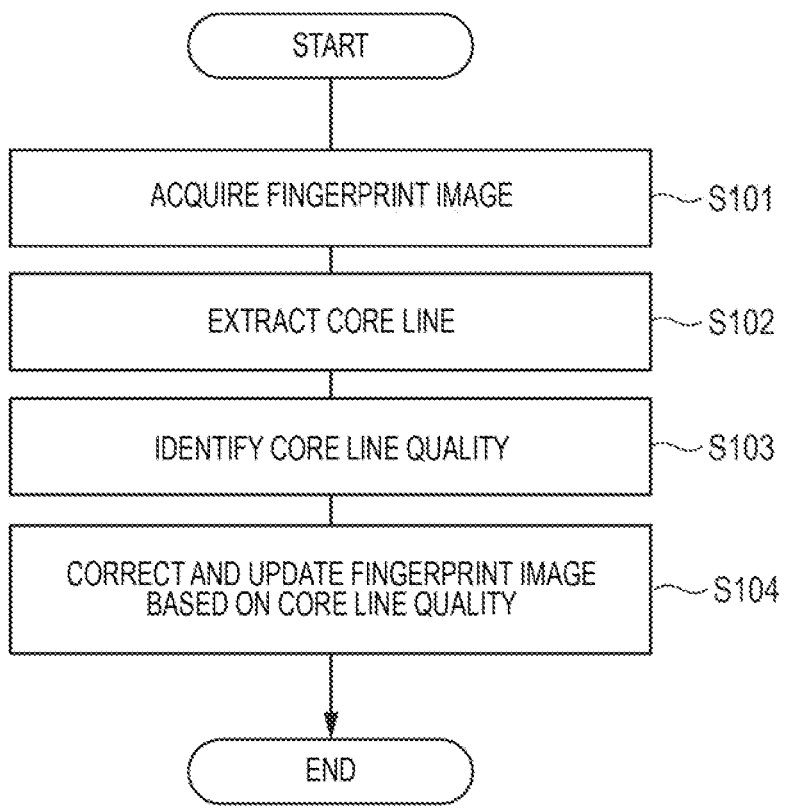
FIG. 3 is a flowchart illustrating an overview of processes performed in the image processing device according to the first example embodiment.

FIG. 3 is a flowchart illustrating the overview of an estimation process of a work amount performed in the image processing device 10 according to the present example embodiment.

In step S101, the fingerprint image acquisition unit 101 acquires the fingerprint image containing the fingerprint from the storage unit 107. The fingerprint image, which is the original image, may be acquired from outside via the input accepting unit 105.

Figure 4:
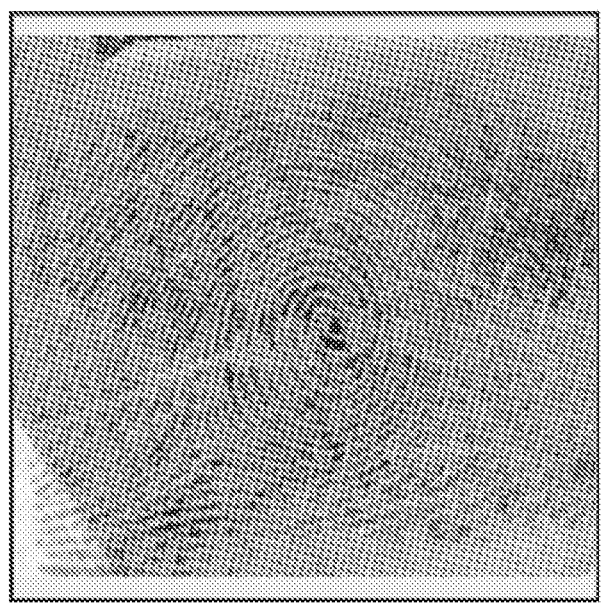
FIG. 4 is a diagram illustrating an example of a fingerprint image to be processed by the image processing device according to the first example embodiment.

FIG. 4 is a diagram illustrating an example of a fingerprint image to be processed by the image processing device 10 according to the present example embodiment. The fingerprint images illustrated in FIG. 4 may be images of patterns transferred on a sheet when one applies ink or the like to fingers and stamps these fingers on the sheet, for example. The fingerprint images are stored in a storage unit 107 or the like in a digitized manner in a predetermined file format. For example, the digitized fingerprint images may be grayscale images. Note that fingerprint images may be images taken by an optical fingerprint reading device or may be images of fingerprints left on an object, and the method of taking the fingerprint images is not particularly limited.

In step S102, the core line extraction unit 102 automatically extracts the core line from the fingerprint image. In the present example embodiment, the core line extraction unit 102 extracts the core line using a first method.

In the fingerprint image illustrated in FIG. 4, the black areas correspond to a ridge of the fingerprint. The core line extraction unit 102 extracts one or more core lines by recognizing black areas (portion with low intensity) of the fingerprint images and generating image data that renders the core lines so as to follow the black areas. Each extracted core line may be, for example, a line with one-pixel width. In addition, as illustrated in FIG. 4, many core lines are extracted to pass near the center of the black part. In this specification, a set of many core lines corresponding to a fingerprint image may be referred to as a core line group.

Here, there are various algorithms used for extraction of core lines performed by the core line extraction unit 102 without being limited to a single algorithm. The difference between these multiple algorithms may be, for example, a difference in parameters for image processing, such as a smoothing, edge enhancement, noise removal, or the like, on a fingerprint image performed as preprocessing before extraction of core lines. Further, another example of differences between multiple algorithms may be a difference in parameters of an extraction process, such as an extraction resolution, a threshold used for determination of a ridge, or the like.

Figure 5:
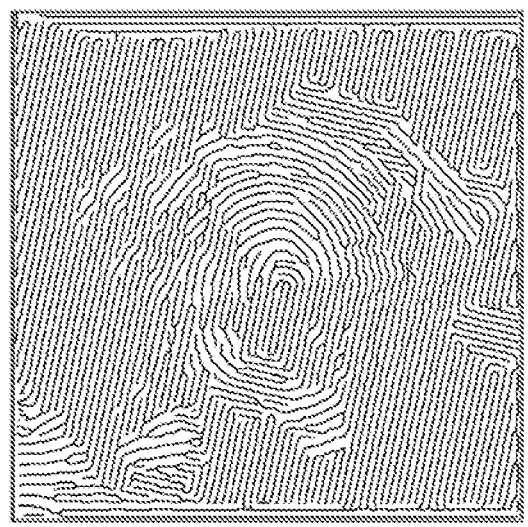
FIG. 5 is a diagram illustrating an example of core line data extracted from a fingerprint image using a first method by the image processing device according to the first example embodiment.

FIG. 5 is a diagram illustrating an example of core line data extracted from a fingerprint image using a first method by the image processing device 10 according to the present example embodiment. Here, core lines representing the form of the fingerprint are extracted from the fingerprint image illustrated in FIG. 4.

In step S103, the core line quality identification unit 103 identifies core line quality for the core lines extracted in the step S102. In the present example embodiment, the phrase "core line quality" assumes an evaluation value indicating the possibility of the fingerprints (dermatoglyphic pattern) regarding the core lines extracted from the fingerprint image. The evaluation value becomes high when the core lines are evaluated as being fingerprint-like and appropriately representing the form of the fingerprint. Conversely, the evaluation value becomes low when the core lines are evaluated as being not fingerprint-like and not adequately representing the form of the fingerprint.

In step S104, when the fingerprint image correction unit 104 corrects the fingerprint image based on the core line quality, the fingerprint image correction unit 104 updates the fingerprint image in the storage unit 107 with the corrected fingerprint image. The storage unit 107 may distinguish and store both the corrected fingerprint image and the original image.

Figure 6:
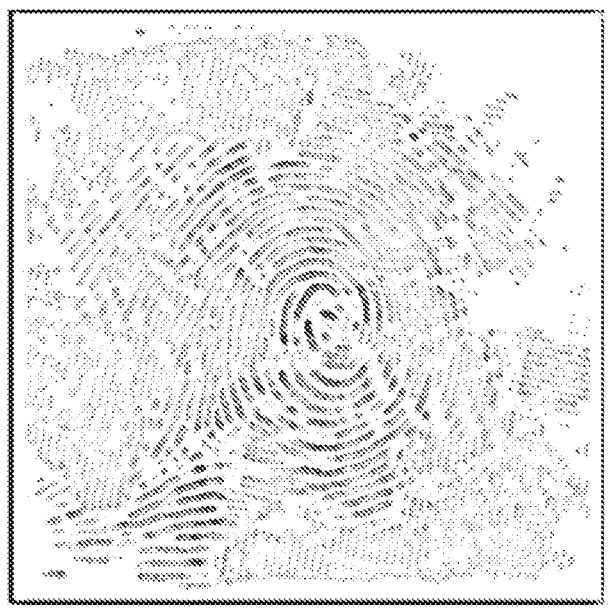
FIG. 6 is a diagram illustrating an example of an image indicating corrected density calculated by the image processing device according to the first example embodiment.

FIG. 6 is a diagram illustrating an example of an image indicating corrected density calculated by the image processing device 10 according to the present example embodiment. In FIG. 6, the dark part in gray areas indicates that the shape of the ridge of the corresponding core line is appropriate. Conversely, the light part in the gray areas indicates that the shape of the ridge of the core line is inappropriate.

Figure 7:
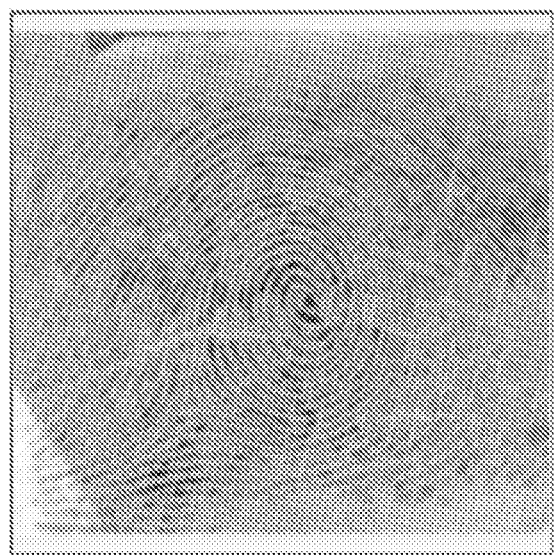
FIG. 7 is a diagram illustrating an example of a corrected fingerprint image generated by the image processing device according to the first example embodiment.

FIG. 7 is a diagram illustrating an example of a corrected fingerprint image generated by the image processing device 10 according to the present example embodiment. Here, the corrected fingerprint image is illustrated with the ridge of the fingerprint corrected to be clearer compared to the original fingerprint image illustrated in FIG. 4.

As described above, the image processing device 10 according to the present example embodiment extracts the core lines from the fingerprint image including fingerprints (dermatoglyphic pattern), identifies the core line quality (evaluation value) indicating the possibility that the core lines are the fingerprint, and corrects the fingerprint image based on the core line quality. Thus, the corrected fingerprint image corrected so that the core lines become clearer is acquired. For example, even if a periodic shape or the like is included in the background of the fingerprint image, the core line quality of the concerned part is determined to be low, so the part can be removed by correction. As a result, the matching accuracy of the fingerprint matching can be improved.

The image processing device 10 described in the above example embodiment can also be configured as in the following second to the eighth example embodiment. Note that a code in common with the code assigned in the figure of the first example embodiment indicates the same object. Descriptions of the common parts with the first example embodiment are omitted, and the different parts are described in detail.

Second Example Embodiment

The image processing device 10 of the present example embodiment differs from the first example embodiment in that the core line quality is identified for each of the plurality of local areas acquired by partitioning the image area of the fingerprint image, and the fingerprint image is corrected, and the correction unit corrects the image for each unit of the plurality of local areas. Furthermore, the image processing device 10 identifies the core line quality for each of the plurality of local areas based on the data size of each of the plurality of local areas in the compressed data in which the fingerprint image is compressed.

Figure 8:
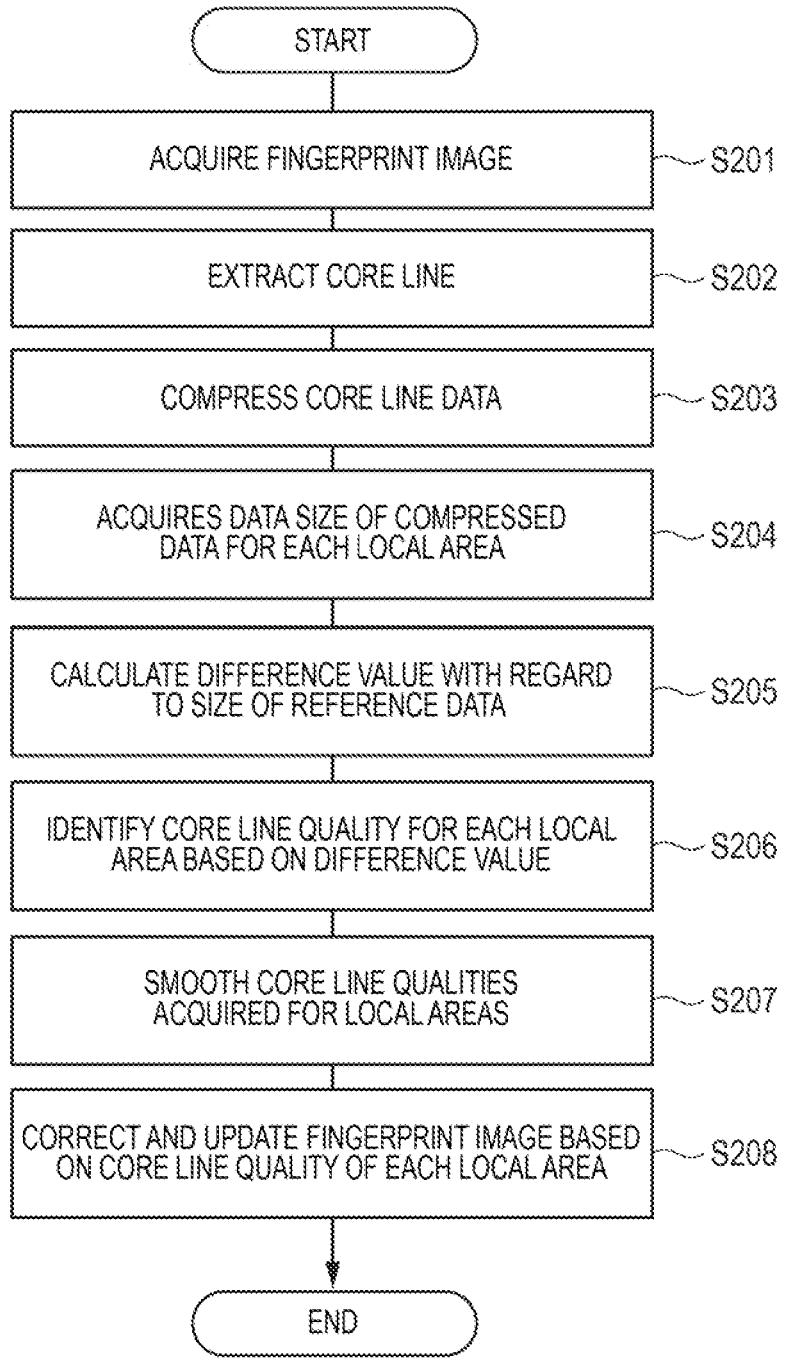
FIG. 8 is a flowchart illustrating an overview of processes performed in the image processing device according to a second example embodiment.

FIG. 8 is a flowchart illustrating an overview of processes performed in the image processing device 10 according to the present example embodiment.

In step S201, the fingerprint image acquisition unit 101 acquires the fingerprint image containing the fingerprint from the storage unit 107. The fingerprint image may be acquired from outside via the input accepting unit 105.

In step S202, the core line extraction unit 102 uses a predetermined algorithm to automatically extract the core line from the fingerprint image.

In step S203, the core line quality identification unit 103 compresses core line data extracted in the step S202.

In step S204, the core line quality identification unit 103 acquires the data size of compressed data for each local area.

FIG. 9 is a diagram illustrating an example of the compressed data generated for each local area by the image processing device 10 according to the present example embodiment. Here, the core line data is partitioned into a total of 64 blocks of 8×8 local areas, and the data size of the compressed data is determined for each block. The shading in the image indicates the size of the compressed data.

In step S205, the core line quality identification unit 103 calculates the difference value between the data size of each of the plurality of local areas in the compressed data and the size of reference data. The reference data size is, for example, the data size after compression processing for the area corresponding to the core line of the known fingerprint image.

In step S206, the core line quality identification unit 103 identifies the core line quality for each local area based on the difference value.

In step S207, the core line quality identification unit 103 smooths the core line qualities acquired for the local areas.

Figure 10:
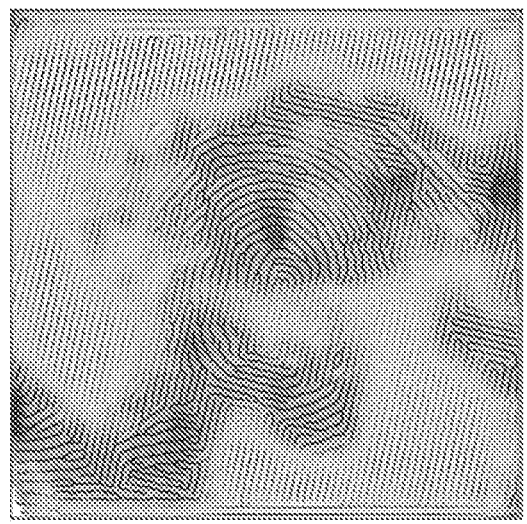
FIG. 10 is a diagram illustrating an example of compressed data smoothed by the image processing device according to the second example embodiment.

FIG. 10 is a diagram illustrating an example of compressed data smoothed by the image processing device 10 according to the present example embodiment. Here, the state in which the core line qualities of the plurality of local areas are smoothed is illustrated in an image divided into 64 pieces.

In step S208, the fingerprint image correction unit 104 corrects and updates the fingerprint image based on the core line quality of each local area.

Specifically, the fingerprint image correction unit 104 of the present example embodiment first calculates a corrected density based on the following calculation formula (1).

$$y=(\text{0xff})*(C-\text{abs}(C-x))/C \qquad (1)$$

Here, "0xff" denotes an image density corresponding to the core line. The density of the background part in each core line is "0x00". "y" denotes the corrected density and is applied only to the core line. "C" denotes a constant such as 128 and is the size of the ideal compressed core line. "x" denotes a compressed data size of the relevant part (local area). "abs( )" denotes an absolute value.

The reason for including the absolute value in the formula (1) is that the shape of the core line is not appropriately represented not only in the case where the data size of the compressed data is too small compared to the reference value, but also in the case where the data size is too large compared to the reference value. That is, the closer the data size pertaining to the local area is to the size of the ideal compressed core line (reference value), the higher the core line quality. On the contrary, the higher the data size pertaining to the local area deviates from the reference value, the lower the core line quality.

Next, the fingerprint image correction unit 104 determines the updated pixel value of the input fingerprint image based on the following calculation formula (2), and generates a corrected fingerprint image.

$$z=i+y'/a \qquad (2)$$

"z" denotes an updated pixel value. "y'" denotes a density of the image acquired by further smoothing the image of the correction value generated based on the corrected density "y" calculated by the formula (1). "i" denotes an input pixel value. "a" denotes a constant.

Furthermore, the fingerprint image correction unit 104 determines an updated pixel value for an invalid area (e.g., an unknown zone such as a background part) based on the following formula (3), and generates the corrected fingerprint image.

$$z'=z-c \qquad (3)$$

"z'" denotes an updated pixel value to be set when the area information of the local area is an invalid area. "c" denotes a constant.

As described above, the image processing device 10 according to the present example embodiment identifies the core line quality for each of the plurality of local areas acquired by dividing the fingerprint image and corrects the image for each unit of the plurality of local areas. Thus, since the fingerprint image can be corrected for each local area, the corrected fingerprint image with higher accuracy than that of the first example embodiment can be generated.

Moreover, the image processing device 10 according to the present example embodiment identifies the core line quality of each of the plurality of local areas based on the data size of each of the plurality of local areas in the compressed data acquired by compressing the fingerprint image. Thus, as the core line quality in the local area can be identified by relatively simple processing, it is easy to implement.

Furthermore, in each of the plurality of local areas, the image processing device 10 according to the present example embodiment identifies the core line quality based on the difference between the data size of the compressed data in the local area and a predefined reference data size. Thus, the core line quality can be identified with high precision because the core line quality can be identified by comparison with a statistically prescribed reference value.

Third Example Embodiment

The image processing device 10 according to the present example embodiment differs from the first example embodiment in that the image processing device 10 further has a function of extracting core line data from a common fingerprint image using multiple algorithms.

Figure 11:
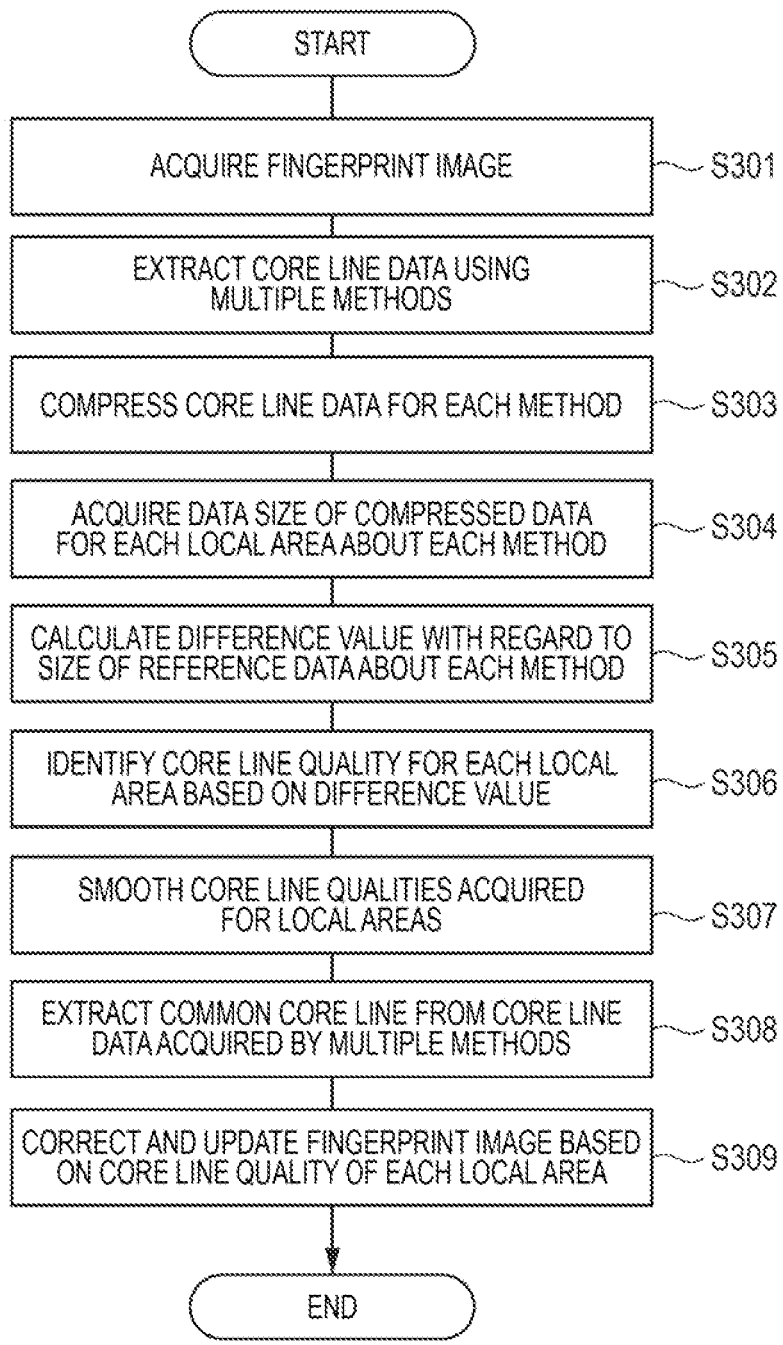
FIG. 11 is a flowchart illustrating an overview of processes performed in the image processing device according to a third example embodiment.

FIG. 11 is a flowchart illustrating an overview of processes performed in the image processing device 10 according to the present example embodiment.

In step S301, the fingerprint image acquisition unit 101 acquires the fingerprint image containing the fingerprint from the storage unit 107. The fingerprint image may be acquired from outside via the input accepting unit 105.

In step S302, the core line extraction unit 102 extracts core line data using the multiple methods. In the present example embodiment, the case of two types of algorithms consisting of the first method and the second method is described as an example, but the types of algorithms are not limited to two types. It is preferable that the multiple methods used for core line extraction have different tendencies for feature extraction.

Figure 12:
FIG. 12 is a diagram illustrating an example of core line data extracted from a fingerprint image using a second method by the image processing device according to the third example embodiment.

FIG. 12 is a diagram illustrating an example of core line data extracted from a fingerprint image using the second method by the image processing device 10 according to the present example embodiment. Here, the core line data extracted by the second method, which is different from the first method used for extracting core line data in FIG. 5, is illustrated. The core line data in FIG. 12 includes core lines of different shapes from the core line data in FIG. 5.

In step S303, the core line quality identification unit 103 compresses the core line data extracted for each method in the step S302.

In step S304, the core line quality identification unit 103 acquires the data size of the compressed data for each local area about each method.

In step S305, the core line quality identification unit 103 calculates the difference value between the data size of each of the plurality of local areas in the compressed data and the reference data size for each method.

In step S306, the core line quality identification unit 103 identifies the core line quality for each local area based on the difference value.

In step S307, the core line quality identification unit 103 smooths the core line qualities acquired for the local areas.

Figure 13:
FIG. 13 is a diagram illustrating an example of compressed data smoothed by the image processing device according to the third example embodiment.

FIG. 13 is a diagram illustrating an example of compressed data smoothed by the image processing device 10 according to the present example embodiment. Here, the case where core line qualities are smoothed for the core line compression data by the second method in FIG. 12 is illustrated. It is preferable to regard the area where the core line does not exist as the background part and to regard the core line quality of the area as undefined.

In step S308, the core line extraction unit 102 extracts the common core line from the core line data acquired by multiple methods.

Figure 14:
FIG. 14 is a diagram illustrating an example of common core line data extracted by the image processing device according to the third example embodiment.

FIG. 14 is a diagram illustrating an example of common core line data extracted by the image processing device 10 according to the present example embodiment. Here, when the core line data of FIG. 5 and FIG. 12 are superimposed, the part of the core line whose shape matches is extracted as the common core line.

In step S309, the fingerprint image correction unit 104 corrects and updates the fingerprint image based on the core line quality in each local area. It is preferable to further perform processing to smooth the entire corrected fingerprint image at the end.

As described above, the image processing device 10 according to the present example embodiment extracts the common core included in both the first core group extracted from the core image using the first method (first algorithm) and the second core group extracted from the fingerprint image using the second method and identifies the core line quality (evaluation value) related to the common core. Thus, the core line data can be extracted with higher accuracy than when the core line is extracted by a single algorithm. As a result, the corrected fingerprint image can be generated with higher accuracy than in the case of the first example embodiment.

Fourth Example Embodiment

The image processing device 10 according to the present example embodiment differs from the first example embodiment in that the image processing device 10 further has a function of correcting the fingerprint image based on the first core line quality acquired from the fingerprint image (first image) including the fingerprint and the second core line quality acquired from the reversed fingerprint image (second image) acquired by reversing the gradation of each pixel of the same fingerprint image (first image).

Figure 15:
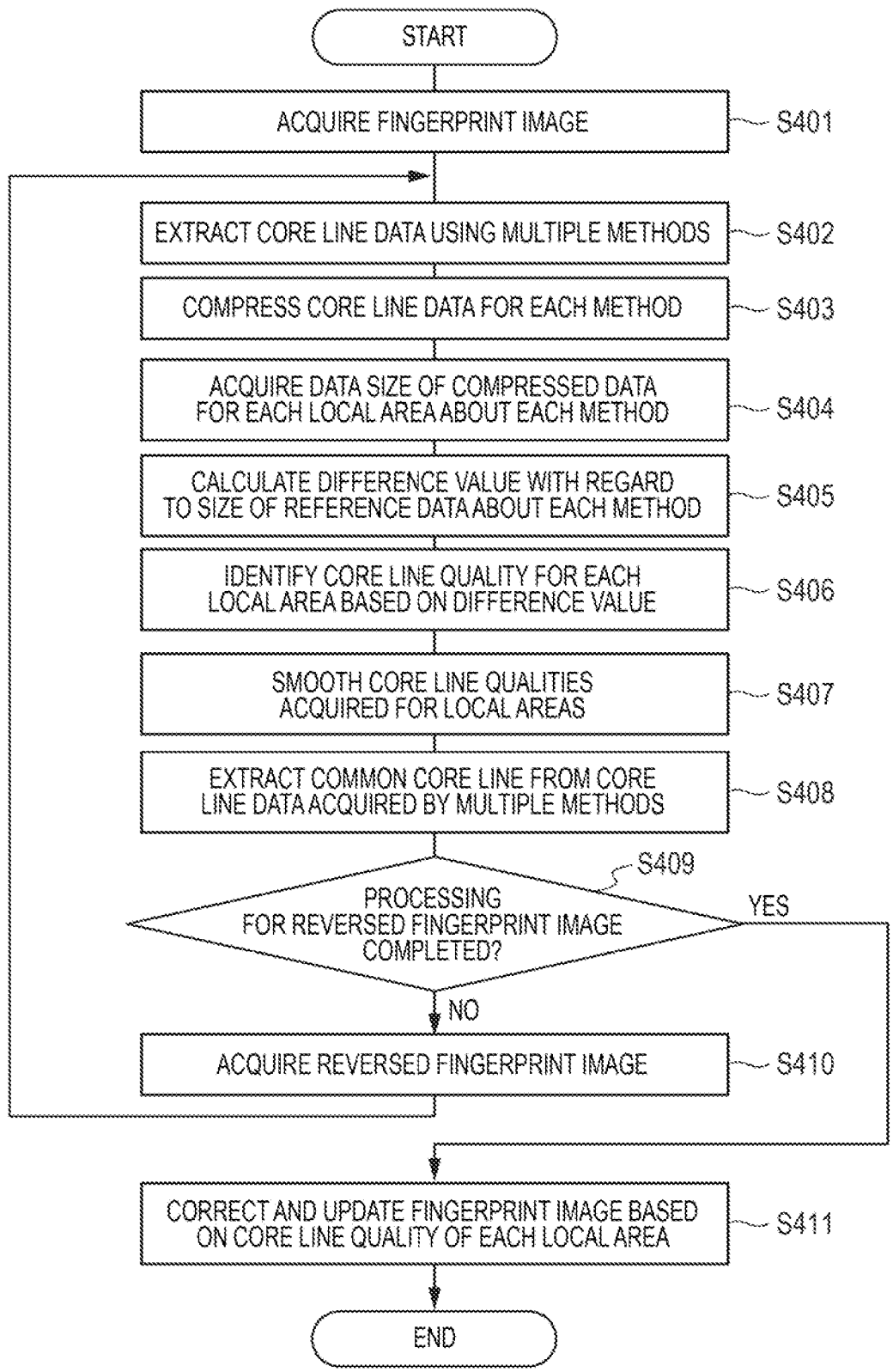
FIG. 15 is a flowchart illustrating an overview of processes performed in the image processing device according to a fourth example embodiment.

FIG. 15 is a flowchart illustrating an overview of processes performed in the image processing device 10 according to the present example embodiment.

In step S401, the fingerprint image acquisition unit 101 acquires the fingerprint image containing the fingerprint from the storage unit 107. The fingerprint image may be acquired from outside via the input accepting unit 105.

In step S402, the core line data is extracted by multiple methods. In the present example embodiment, as in the second example embodiment, the case where the algorithm is of two types, the first method and the second method, is described as an example.

In step S403, the core line quality identification unit 103 compresses the core line data for each method.

In step S404, the core line quality identification unit 103 acquires the data size of the compressed data for each local area about each method.

In step S405, the core line quality identification unit 103 calculates the difference value between the data size of each of the plurality of local areas in the compressed data and the reference data size for each method.

In step S406, a core line quality identification unit 103 identifies core line quality for each local area based on the difference value.

In step S407, the core line quality identification unit 103 smooths the core line qualities acquired for the local areas.

In step S408, the core line extraction unit 102 extracts the common core from the core line data acquired by multiple methods.

In step S409, the core line quality identification unit 103 determines whether processing for the reversed fingerprint image has been completed. Here, when the core line quality identification unit 103 determines that processing for the reversed fingerprint image has been completed (step S409: YES), the process proceeds to step S411.

On the other hand, when the core line quality identification unit 103 determines that the process for the reversed fingerprint image has not been completed (step S409: NO), the process proceeds to step S410.

In step S410, the fingerprint image acquisition unit 101 acquires the reversed fingerprint image in which the gradation of each pixel of the fingerprint image acquired in the step S401 is reversed. Then, the process returns to the step S402, and each unit of the image processing device 10 executes the processes of steps S402 to S409 for the reversed fingerprint image.

Figure 16:
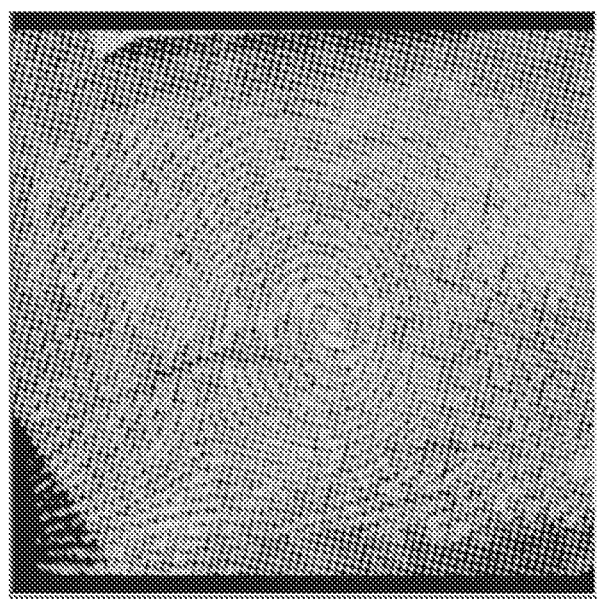
FIG. 16 is a diagram illustrating an example of a reversed fingerprint image generated by the image processing device according to the fourth example embodiment.

FIG. 16 is a diagram illustrating an example of a reversed fingerprint image generated by the image processing device 10 according to the present example embodiment. Here, the ridge part illustrated by the black part in the fingerprint image of FIG. 4 becomes a white part, and the valley part of the ridge illustrated by the white part becomes a black part.

Figure 17:
FIG. 17 is a diagram illustrating an example of common core line data extracted from the reversed fingerprint image by the image processing device according to the fourth example embodiment.

FIG. 17 is a diagram illustrating an example of common core line data extracted from the reversed fingerprint image by the image processing device 10 according to the present example embodiment for the reversed fingerprint image. Here, a common core line different from the common core line in FIG. 14 is illustrated.

In step S411, the fingerprint image correction unit 104 corrects and updates the fingerprint image based on the core line quality of each local area.

Specifically, the fingerprint image correction unit 104 of the present example embodiment calculates the corrected density for each of the fingerprint image that is the original image and the reversed fingerprint image based on the above calculation formula (1).

Next, the fingerprint image correction unit 104 determines the updated pixel value of the input fingerprint image based on the following calculation formula (4) and generates a corrected fingerprint image.

$$z = i + y/a - y'/b \qquad (4)$$

"z" denotes an updated pixel value. "i" denotes an input pixel value. "y" denotes the corrected density calculated from the fingerprint image. "y'" denotes a reversed corrected density calculated from the inversion fingerprint image. "a" and "b" denote constants.

Furthermore, the fingerprint image correction unit 104 determines the updated pixel value for the invalid area based on the above calculation formula (3) and generates the corrected fingerprint image.

Figure 18:
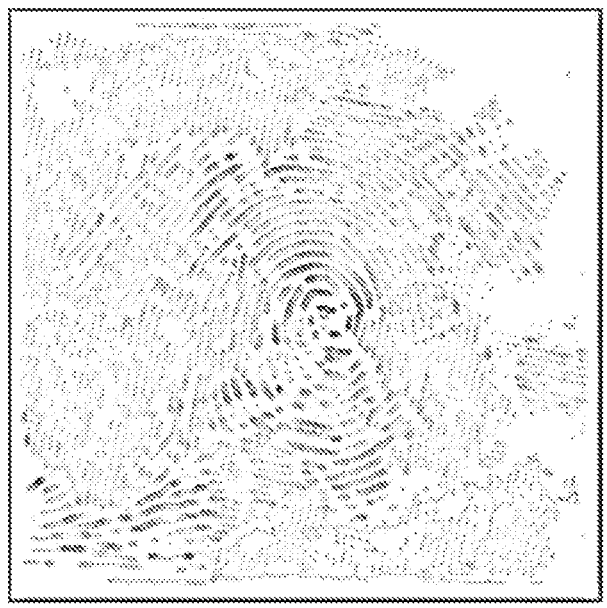
FIG. 18 is a diagram illustrating an example of an image indicating corrected density calculated by the image processing device according to the fourth example embodiment.

FIG. 18 is a diagram illustrating an example of an image indicating corrected density calculated by the image processing device 10 according to the present example embodiment using the reversed fingerprint image. In FIG. 18, a dark gray area indicates that the corresponding ridged linear shape of the core line is appropriate. Conversely, a light gray area indicates that the ridged linear shape of the core line is inappropriate. In the case of a reversed fingerprint image, it is assumed that, unlike the corrected density in FIG. 6 described above, the trough area of the core is illustrated as a dark core line.

It should be noted that in the flowchart of FIG. 15 above, the reversed fingerprint image is acquired (step S410) after the processes of the fingerprint image (steps S402 to S408) is completed, but the order of processes is not limited to this. For example, the fingerprint image and the reversed fingerprint image may be acquired and then the process for both images may be executed, or the process for the fingerprint image and the process for the reversed fingerprint image may be executed in parallel.

As described above, the image processing device 10 according to the present example embodiment corrects the fingerprint image based on the first core line quality (first evaluation value) acquired from the fingerprint image including the fingerprint (first image) and the second core line quality (second evaluation value) acquired from the reversed fingerprint image (second image) acquired by reversing the gradation of each pixel of the fingerprint image (first image). Thus, a corrected fingerprint image in which the core area is more clearly and accurately corrected than when correction processing is performed on the original image can be generated.

Fifth Example Embodiment

The image processing device 10 according to the present example embodiment differs from the first example embodiment in that it is further provided with the function of repeatedly executing the correction processing by re-inputting the corrected fingerprint image generated by the correction processing as the fingerprint image.

Figure 19:
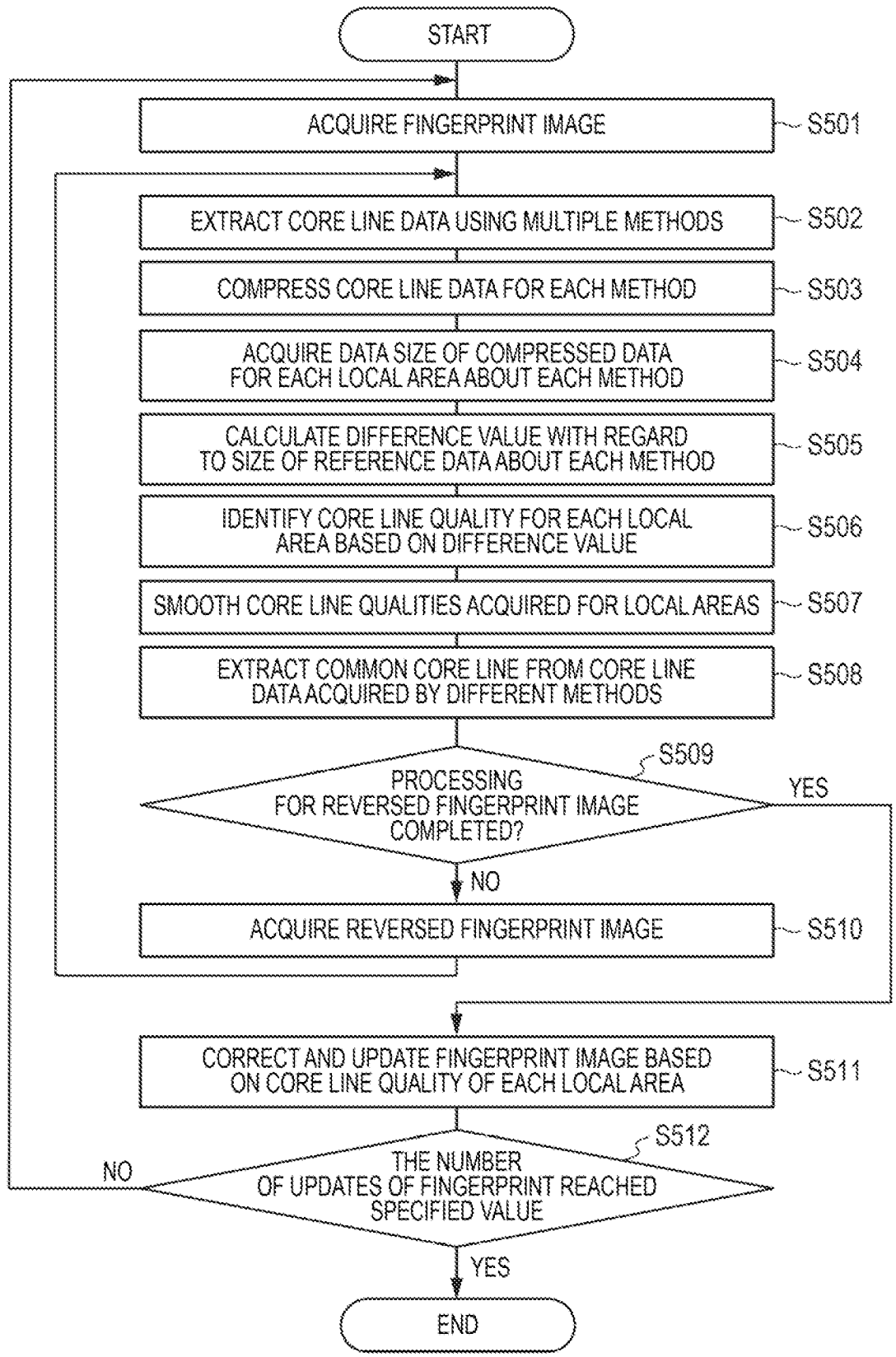
FIG. 19 is a flowchart illustrating an overview of processes performed in the image processing device according to a fifth example embodiment.

FIG. 19 is a flowchart illustrating an overview of processes performed in the image processing device 10 according to the present example embodiment.

In step S501, the fingerprint image acquisition unit 101 acquires the fingerprint image containing the fingerprint from the storage unit 107. The fingerprint image may be acquired from outside via the input accepting unit 105.

In step S502, the core line extraction unit 102 extracts the core line data using the multiple methods.

In step S503, the core line quality identification unit 103 compresses the core line data for each method.

In step S504, the core line quality identification unit 103 acquires the data size of the compressed data for each local area about each method.

In step S505, the core line quality identification unit 103 calculates, for each method, a difference value between the data size of each of the plurality of local areas in the compressed data and the reference data size.

In step S506, the core line quality identification unit 103 identifies the core line quality for each local area based on the difference value.

In step S507, the core line quality identification unit 103 smooths the core line qualities acquired for the local areas.

In step S508, the core line extraction unit 102 extracts the common core line from the core line data acquired by multiple methods.

In step S509, the core line quality identification unit 103 determines whether the process for the reversed fingerprint image has been completed. Here, when the core line quality identification unit 103 determines that the process for the reversed fingerprint image has been completed (step S509: YES), the process proceeds to step S511.

On the other hand, when the core line quality identification unit 103 determines that the process for the reversed fingerprint image has not been completed (step S509: NO), the process proceeds to step S510.

In step S510, the fingerprint image acquisition unit 101 acquires the reversed fingerprint image. Then, the process returns to step S502, and each section of the image processing device 10 executes processes of steps S502 to S509 for the reversed fingerprint image.

In step S511, the fingerprint image correction unit 104 corrects and updates the fingerprint image based on the core line quality for each local area.

In step S512, the fingerprint image correction unit 104 determines whether the number of updates of the fingerprint image has reached a prescribed value. Here, when the fingerprint image correction unit 104 determines that the number of updates of the fingerprint image has reached the prescribed value (step S512: YES), the process ends.

On the other hand, when the fingerprint image correction unit 104 determines that the number of updates of the fingerprint image has not reached the prescribed value (step S512: NO), the process returns to the step S501, and the processes of steps S501 to S512 are repeated.

Figure 20:
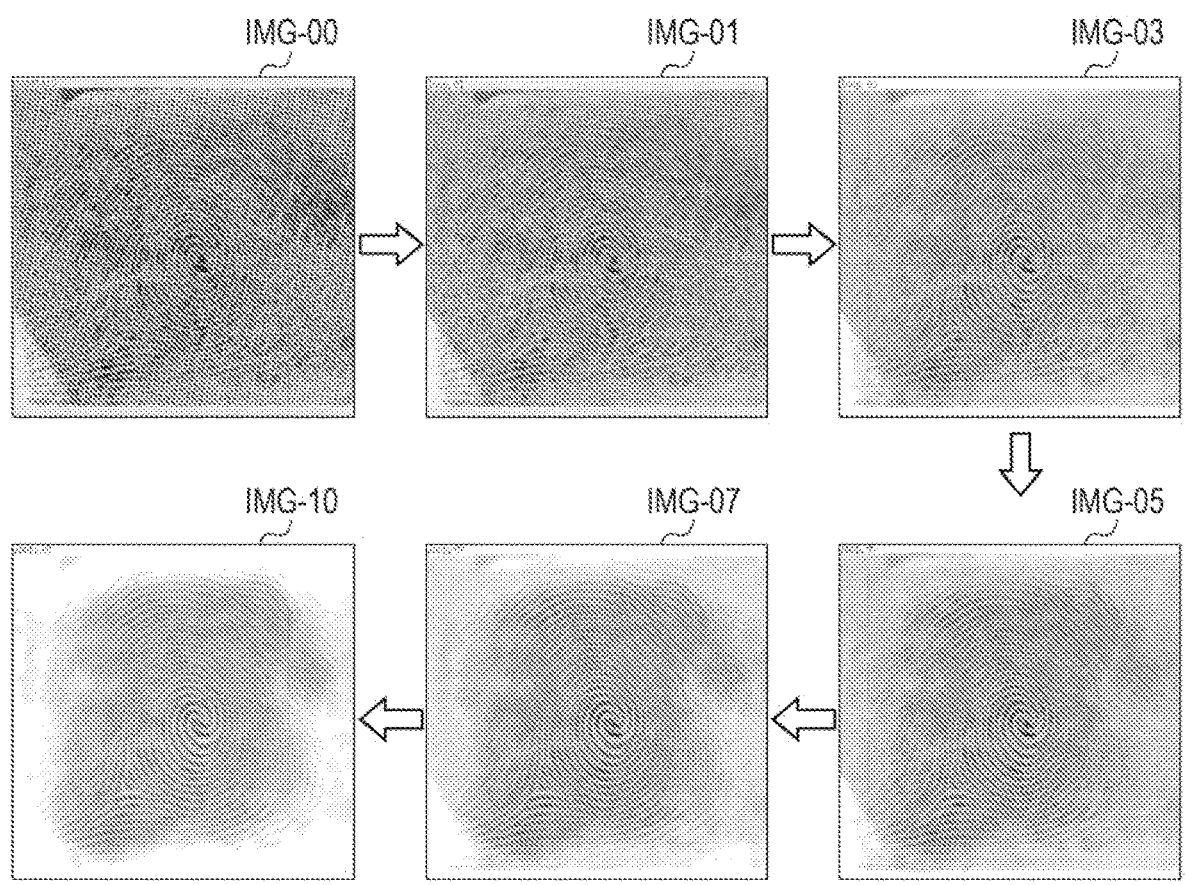
FIG. 20 is a diagram for explaining the number of correction processing executed in the image processing device according to the fifth example embodiment and the change in a corrected fingerprint image.

FIG. 20 is a diagram for explaining the number of correction processing executed in the image processing device 10 according to the present example embodiment and the change in the corrected fingerprint image. Here, the original image IMG-00, the corrected fingerprint image IMG-01, the corrected fingerprint image IMG-03, the corrected fingerprint image IMG-05, the corrected fingerprint image IMG-07 and the corrected fingerprint image IMG-10 corresponding to the number of updates 0, 1, 3, 5, 7 and 10 respectively are illustrated. As the number of updates increases, the core lines in the image are corrected to become clearer. In addition, background areas other than fingerprints and obscure black areas are corrected to reduce image density.

It should be noted that in the flowchart of FIG. 19 described above, the reversed fingerprint image is acquired (step S510) after the processes of the fingerprint image (steps S502 to S508) is completed, but the process order is not limited to this. For example, the fingerprint image and the reversed fingerprint image may be acquired and then the process for both images may be executed, or the process for the fingerprint image and the process for the reversed fingerprint image may be executed in parallel.

As described above, the image processing device 10 according to the present example embodiment re-inputs the corrected image generated by the correction processing as an image. Thereby, the correction processing is repeatedly executed, and a corrected fingerprint image in which the core area is more sharply corrected with respect to the original image can be generated.

Sixth Example Embodiment

The image processing device 10 according to the present example embodiment differs from the first to fifth example embodiments in that it further has a function of displaying the corrected fingerprint image generated by the correction processing on the screen.

Figure 21:
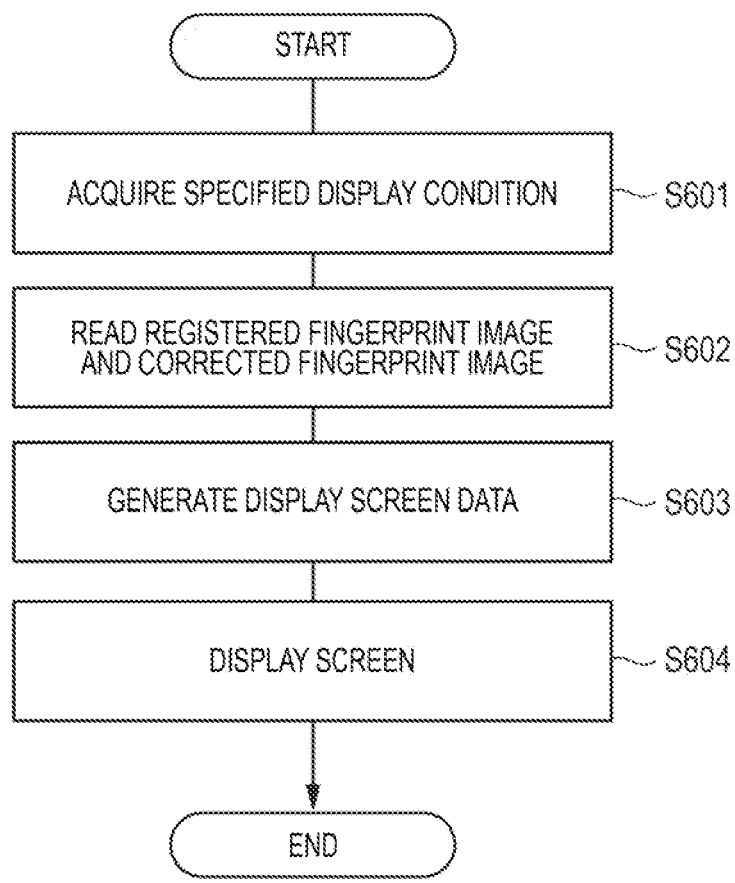
FIG. 21 is a flowchart illustrating an overview of processes performed in the image processing device according to a sixth example embodiment.

FIG. 21 is a flowchart illustrating an overview of processes performed in the image processing device 10 according to the present example embodiment. This processing can be executed after step S512 of the flowchart of FIG. 19 described in the fifth example embodiment, for example.

In step S601, the display control unit 106 acquires a display condition of the corrected fingerprint image specified by the worker. The display condition can be specified, for example, on a screen for selecting the display condition. The display condition includes, for example, the number of repetitions of the correction processing required to generate the corrected fingerprint image to be displayed, setting information on whether or not to include the fingerprint image initially registered as the original image (Hereafter referred to as "registered fingerprint image") in the display object, and information on specifying the number of repetitions, or the like.

In step S602, the display control unit 106 reads the registered fingerprint image, which is the original image, and the corrected fingerprint image, for which correction processing has been applied to the original image, from the storage unit 107 based on the display condition specified in the step S601. It is assumed that information on the number of repetitions of the correction processing is associated with the corrected fingerprint image of the present example embodiment. In the second and subsequent correction processing, as described in the fifth example embodiment, the corrected fingerprint image generated in the immediately preceding correction processing is used as the original image.

In step S603, the display control unit 106 generates display screen data based on the setting information, the registered fingerprint image and the corrected fingerprint image.

In step S604, the display control unit 106 displays a display screen based on the display screen data generated in the step S603 on the display device 156 and the process ends.

FIGS. 22 to 27 are diagrams illustrating an example of the display screen displayed in the image processing device 10 according to the present example embodiment. The display screen illustrated in each figure is only an example. The types of data items displayed on the display screen and the format of the display screen can be changed freely.

Figure 22:
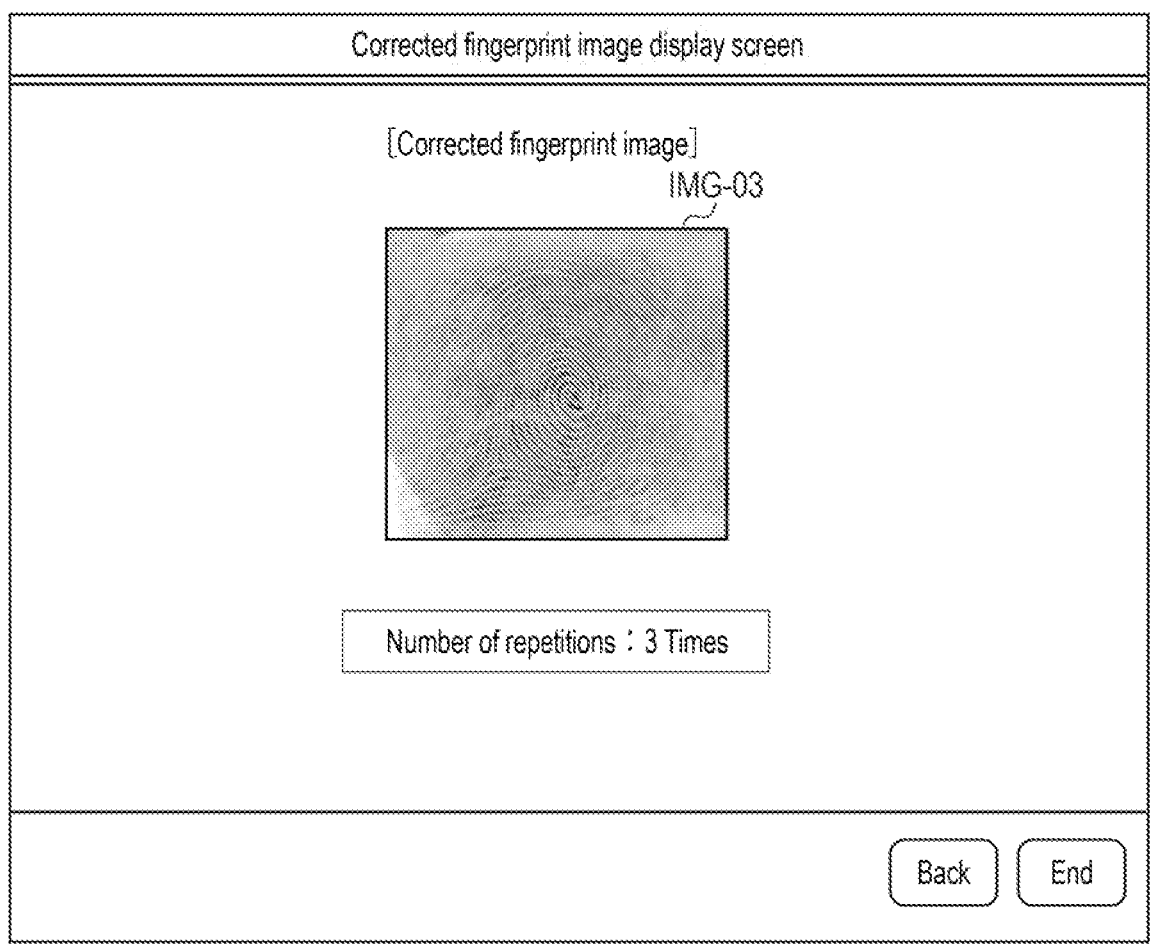
FIG. 22 is a diagram illustrating an example of a display screen displayed in the image processing device according to the sixth example embodiment.

The display screen illustrated in FIG. 22 includes a corrected fingerprint image IMG-03 specified by the worker and information on the number of repetitions of correction processing associated with the corrected fingerprint image IMG-03. That is, FIG. 22 illustrates that the corrected fingerprint image IMG-03 is an image generated by repeating correction processing 3 times with a registered fingerprint image (not illustrated) as the first original image.

Figure 23:
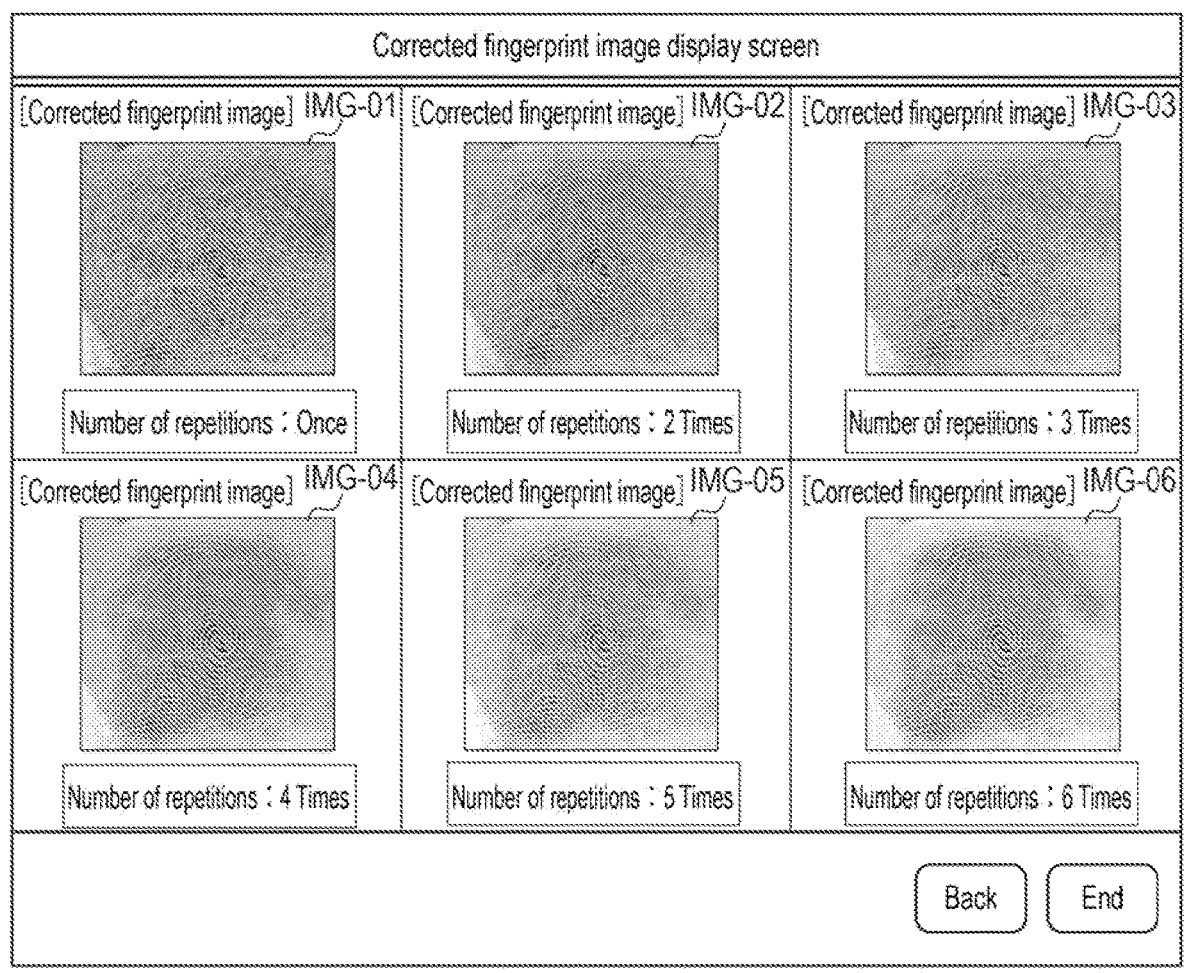
FIG. 23 is a diagram illustrating an example of the display screen displayed in the image processing device according to the sixth example embodiment.

On the display screen illustrated in FIG. 23, a plurality of corrected fingerprint images IMG-01 to IMG-06 and information on the number of repetitions of correction processing for each corrected fingerprint image are displayed side by side. The number of repetitions of the correction processing for the corrected fingerprint images IMG-01 to IMG-06 is 1 to 6 times, respectively. For example, the corrected fingerprint image IMG-03 is an image generated using the corrected fingerprint image IMG-02 generated in the previous correction processing as the original image.

Figure 24:
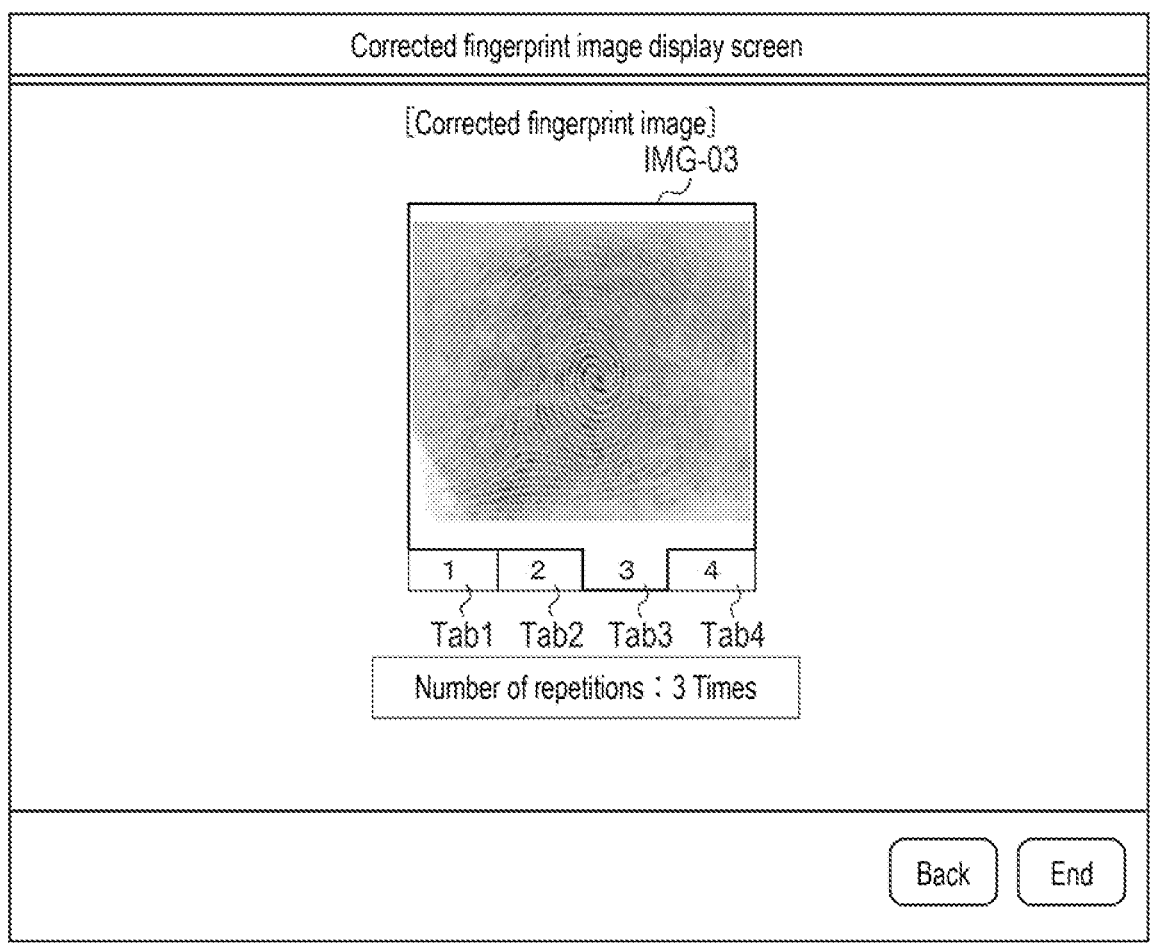
FIG. 24 is a diagram illustrating an example of the display screen displayed in the image processing device according to the sixth example embodiment.

In the display screen illustrated in FIG. 24, the corrected fingerprint image IMG-03 specified by the worker, information on the number of repetitions of the correction processing associated with the corrected fingerprint image IMG-03 (number of repetitions: 3 times), and four tabs Tab1 to Tab4 for selecting the number of repetitions of the correction processing pertaining to the corrected fingerprint image to be displayed are included. When the worker selects one of the tabs Tab1 to Tab4, the corrected fingerprint image displayed on the screen is switched.

Figure 25:
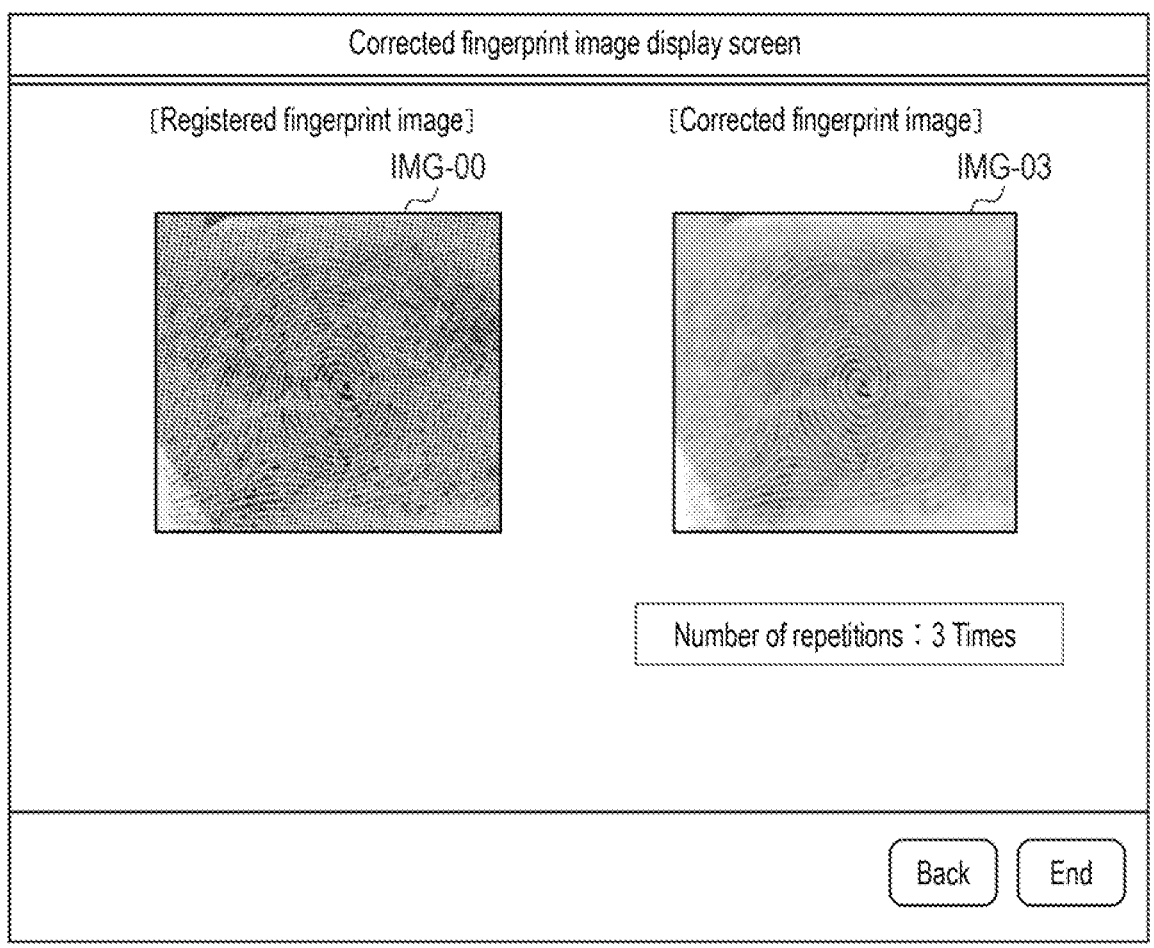
FIG. 25 is a diagram illustrating an example of the display screen displayed in the image processing device according to the sixth example embodiment.

In the display screen illustrated in FIG. 25, the registered fingerprint image IMG-00 is further included as a display object for the display screen illustrated in FIG. 22. The worker can compare the registered fingerprint image IMG-00 before the correction processing with the corrected fingerprint image IMG-03 after the correction processing by referring to the same display screen.

Figure 26:
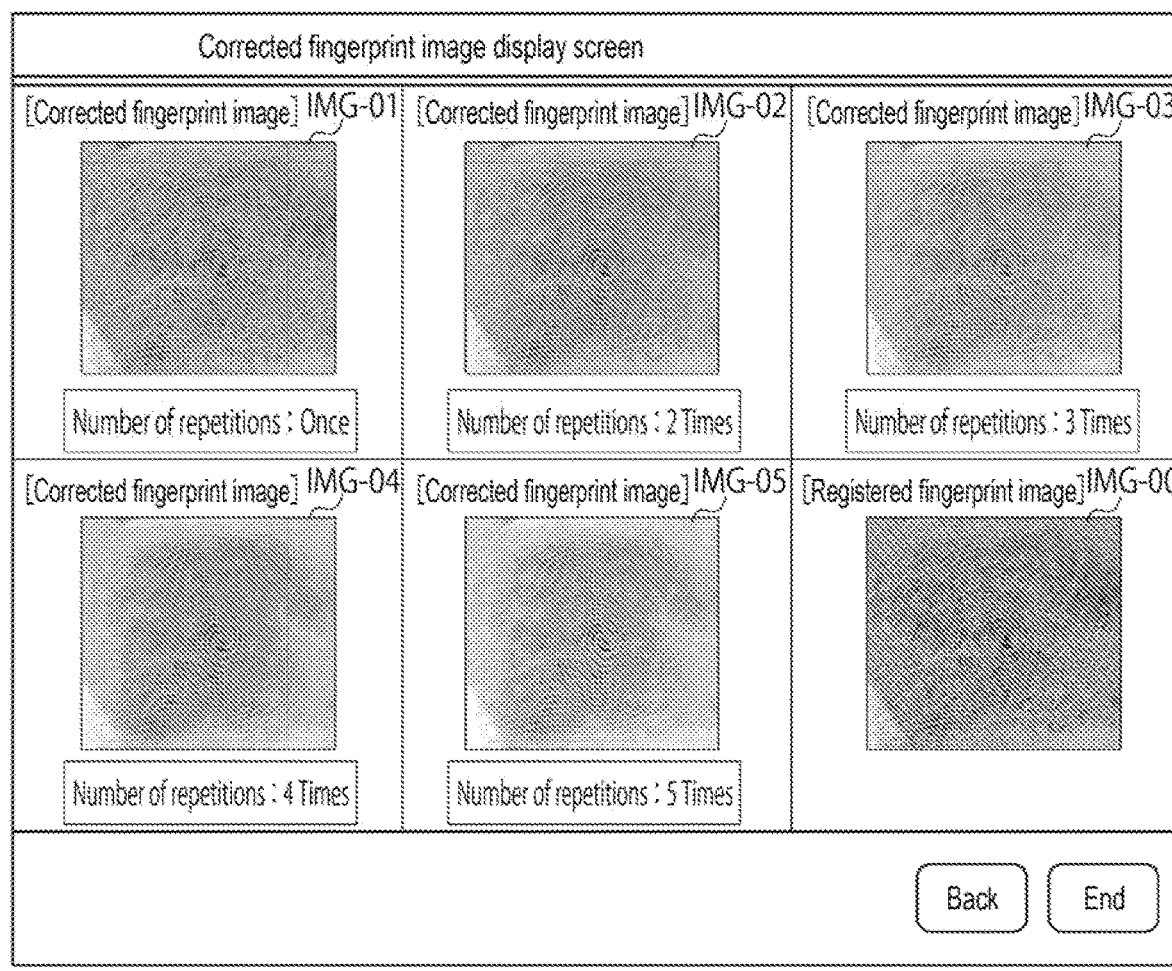
FIG. 26 is a diagram illustrating an example of the display screen displayed in the image processing device according to the sixth example embodiment.

In the display screen illustrated in FIG. 26, among the 6 kinds of corrected fingerprint images IMG-01 to IMG-06 included in the display screen illustrated in FIG. 23 above, the corrected fingerprint image IMG-06 is replaced with the registered fingerprint image IMG-00. By referring to the display screen, the worker can collectively compare the registered fingerprint image IMG-00 before the correction processing and the plurality of corrected fingerprint images IMG-01 to IMG-05 generated stepwise by the multiple times of correction processing.

Figure 27:
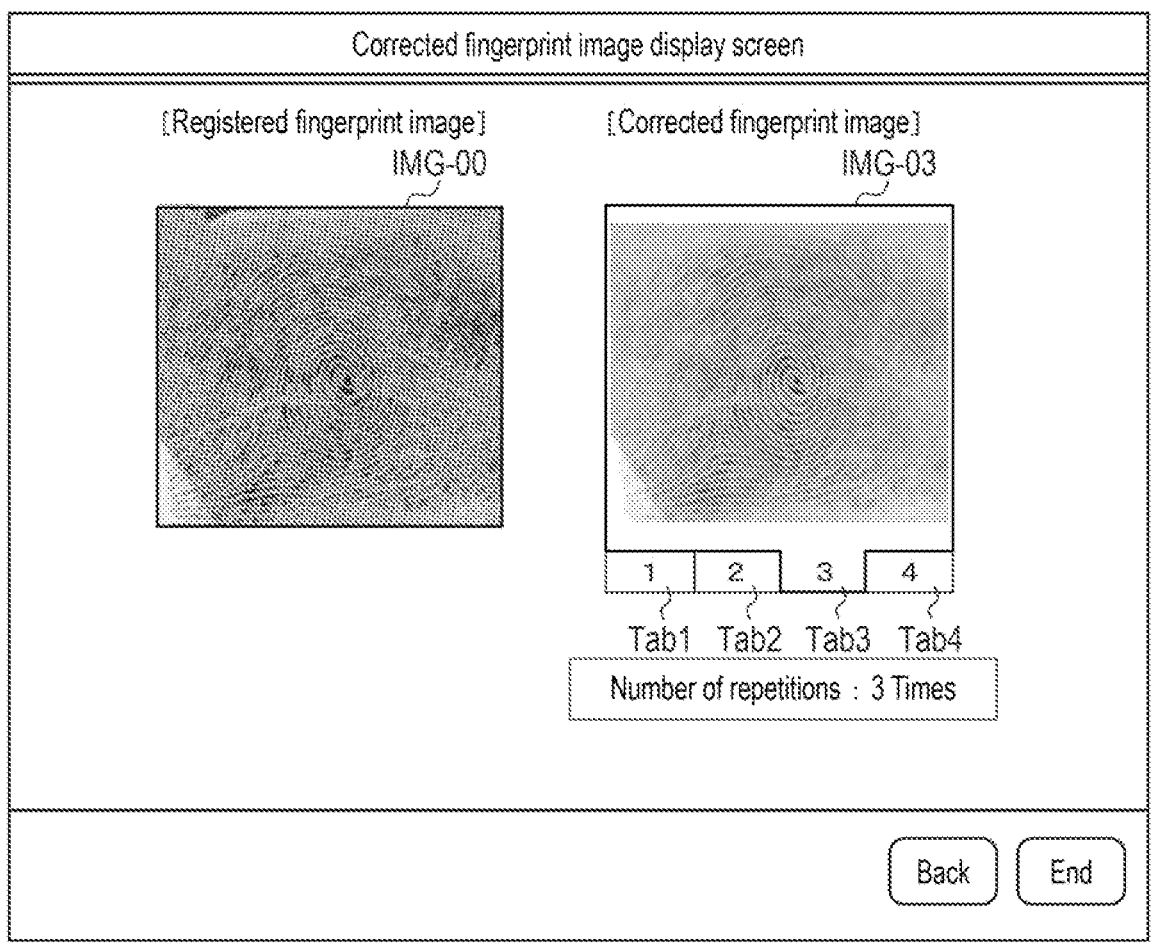
FIG. 27 is a diagram illustrating an example of the display screen displayed in the image processing device according to the sixth example embodiment.

In the display screen illustrated in FIG. 27, unlike the above FIG. 25, the corrected fingerprint image to be displayed is displayed in the form of selecting one of the multiple tabs Tab1 to Tab4. The worker selects one of the tabs Tab1 to Tab4 and switches the corrected fingerprint image to be displayed on the screen. That is, the worker can easily select the corrected fingerprint image to be compared with the registered fingerprint image IMG-00.

As described above, the image processing device 10 according to the present example embodiment displays the corrected fingerprint image generated by the correction processing on the screen. Thus, the worker can easily check the state of the core line included in the corrected fingerprint image.

Seventh Example Embodiment

Figure 28:
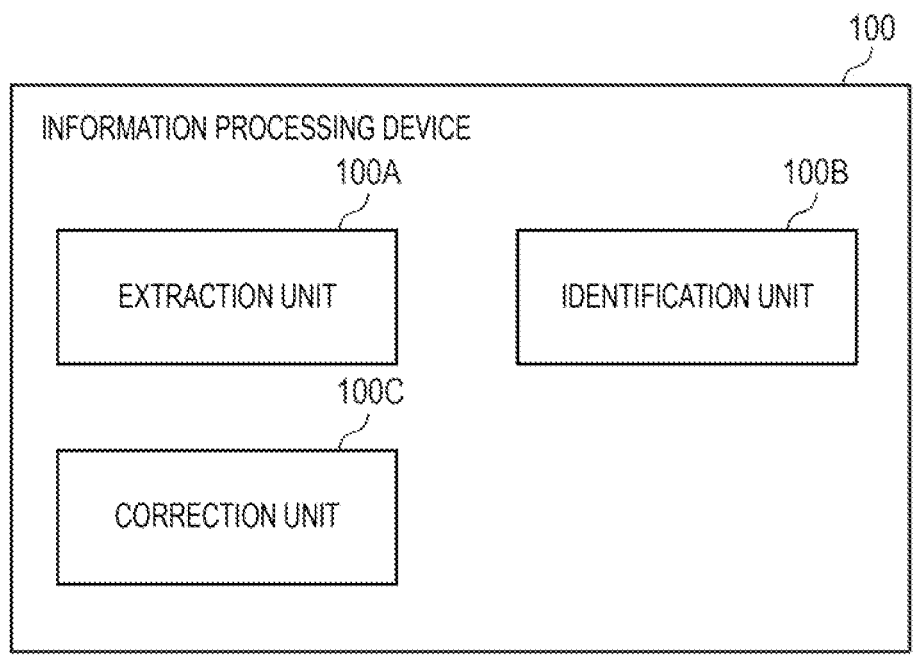
FIG. 28 is a function block diagram of an information processing device according to a seventh example embodiment.

FIG. 28 is a function block diagram of an information processing device 100 according to the present example embodiment. The information processing device 100 includes an extraction unit 100A, an identification unit 100B and a correction unit 100C. The extraction unit 100A extracts a core line from an image containing dermatoglyphic pattern. The identification unit 100B identifies an evaluation value indicating possibility of the dermatoglyphic pattern of the core line. The correction unit 100C corrects the image based on the evaluation value.

According to the present example embodiment, an information processing device 100 capable of improving the accuracy of matching processing of dermatoglyphic pattern is provided.

Eighth Example Embodiment

Figure 29:
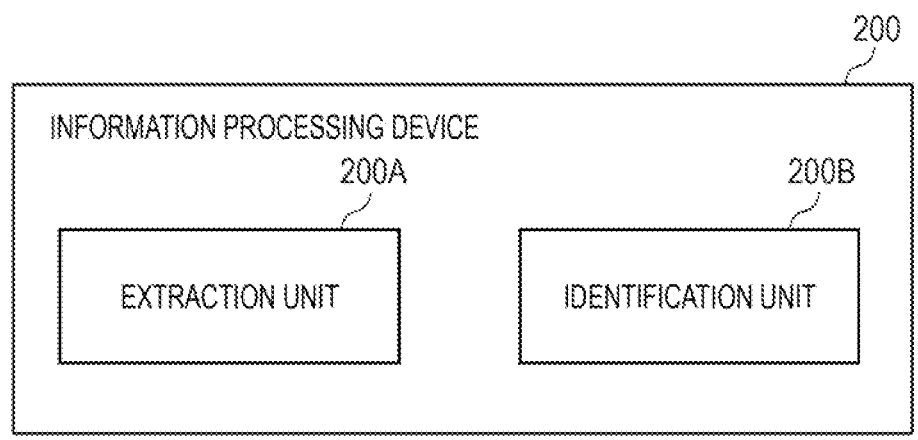
FIG. 29 is a function block diagram of an information processing device according to an eighth example embodiment.

FIG. 29 is a function block diagram of an information processing device 200 according to the present example embodiment. The information processing device 200 includes an extraction unit 200A and an identification unit 200B. The extraction unit 100A extracts a core line from an image containing dermatoglyphic pattern. The identification unit 200B identifies an evaluation value indicating possibility of the dermatoglyphic pattern of the core line based on data size of compressed data of the image.

According to the present example embodiment, an information processing device 200 capable of improving the accuracy of matching processing of dermatoglyphic is provided.

Modified Example Embodiment

Although the disclosure has been described above with reference to the example embodiments, the disclosure is not limited to the example embodiments described above. Various modifications that may be understood by those skilled in the art can be made to the configuration and details of the disclosure within the scope not departing from the spirit of the disclosure. For example, it should be understood that an example embodiment in which a part of the configuration of any of the example embodiments is added to another example embodiment or an example embodiment in which a part of the configuration of any of the example embodiments is replaced with a part of another example embodiment is also one of the example embodiments to which the disclosure may be applied.

The scope of each of the example embodiments also includes a processing method that stores, in a storage medium, a program that causes the configuration of each of the example embodiments to operate so as to implement the function of each of the example embodiments described above, reads the program stored in the storage medium as a code, and executes the program in a computer. That is, the scope of each of the example embodiments also includes a computer readable storage medium. Further, each of the example embodiments includes not only the storage medium in which the program described above is stored but also the individual program itself.

As the storage medium, for example, a floppy (registered trademark) disk, a hard disk, an optical disk, a magneto-optical disk, a CD-ROM, a magnetic tape, a nonvolatile memory card, or the like can be used. Further, the scope of each of the example embodiments also includes an example that operates on OS to perform a process in cooperation with another software or a function of an add-in board without being limited to an example that performs a process by an individual program stored in the storage medium.

The whole or part of the example embodiments disclosed above can be described as, but not limited to, the following supplementary notes.

(Supplementary Note 1)
An information processing device comprising:
an extraction unit that extracts a core line from an image containing dermatoglyphic pattern;
an identification unit that identifies an evaluation value indicating possibility of dermatoglyphic pattern of the core line; and
a correction unit that corrects the image based on the evaluation value.

(Supplementary Note 2)
The information processing device according to supplementary note 1, wherein the identification unit identifies the evaluation value for each of the plurality of local areas acquired by partitioning the image,
wherein the correction unit corrects the image for each unit of the plurality of local areas.

(Supplementary Note 3)
The information processing device according to supplementary note 2, wherein the identification unit identifies the evaluation value for each of the plurality of local areas based on data size of each of the plurality of local areas in compressed data of the image.

(Supplementary Note 4)
The information processing device according to supplementary note 3, wherein the identification unit identifies the evaluation value for each of the plurality of local areas based on a difference between the data size and a predetermined reference data size.

(Supplementary Note 5)
The information processing device according to any one of supplementary notes 1 to 4, wherein the correction unit corrects the image based on a first evaluation value acquired from a first image including the dermatoglyphic pattern and a second evaluation value acquired from a second image obtained by reversing the gradation of each pixel of the first image.

(Supplementary Note 6)
The information processing device according to any one of supplementary notes 1 to 5, wherein the extraction unit re-inputs a corrected image generated by the correction processing in the correction unit as the image.

(Supplementary Note 7)
The information processing device according to any one of supplementary notes 1 to 6, wherein the extraction unit extracts a common core line included in both a first core line group extracted from the image using a first method and a second core line group extracted from the image using a second method, and
wherein the identification unit identifies the evaluation value related to the common core line.

(Supplementary Note 8)
An information processing device comprising:
an extraction unit that extracts a core line from an image containing dermatoglyphic pattern; and
an identification unit that identifies an evaluation value indicating possibility of the dermatoglyphic pattern of the core line based on data size of compressed data of the image.

(Supplementary Note 9)
An information processing method comprising:
extracting a core line from an image containing dermatoglyphic pattern;
identifying an evaluation value indicating possibility of the dermatoglyphic pattern of the core line; and correcting the image based on the evaluation value.
(Supplementary Note 10)

A storage medium storing a program that causes a computer to perform:
- extracting a core line from an image containing dermatoglyphic pattern;
- identifying an evaluation value indicating possibility of the dermatoglyphic pattern of the core line; and
- correcting the image based on the evaluation value.

This application is based upon and claims the benefit of priority from Japanese Patent Application No. 2021-008538, filed on Jan. 22, 2021, the disclosure of which is incorporated herein in its entirety by reference.

REFERENCE SIGNS LIST 10 image processing device
100,200 information processing device
100A,200A extraction unit
100B,200B identification unit
100C correction unit
101 fingerprint image acquisition unit
102 core line extraction unit
103 core line quality identification unit
104 fingerprint image correction unit
105 input accepting unit
106 display control unit
107 storage unit
151 processor
152 RAM
153 ROM
154 storage
155 communication I/F
156 display device
157 input device

What is claimed is:

1. An information processing device comprising:
a memory configured to store instructions; and
a processor configured to execute instructions to:
extract a core line from an image containing dermatoglyphic pattern;
identify an evaluation value indicating possibility of dermatoglyphic pattern of the core line; and
correct the image based on the evaluation value,
wherein the identification identifies the evaluation value for each of a plurality of local areas acquired by partitioning the image,
wherein the correction corrects the image for each unit of the plurality of local areas, and
wherein the identification identifies the evaluation value for each of the plurality of local areas based on data size of each of the plurality of local areas in compressed data of the image.

2. The information processing device according to claim 1, wherein the identification unit identifies the evaluation value for each of the plurality of local areas based on a difference between the data size and a predetermined reference data size.

3. The information processing device according to claim 1, wherein the correction corrects the image based on a first evaluation value acquired from a first image including the dermatoglyphic pattern and a second evaluation value acquired from a second image obtained by reversing the gradation of each pixel of the first image.

4. The information processing device according to claim 1, wherein the extraction re-inputs a corrected image generated by the correction processing in the correction as the image.

5. The information processing device according to claim 1, wherein the extraction extracts a common core line included in both a first core line group extracted from the image using a first method and a second core line group extracted from the image using a second method, and
wherein the identification identifies the evaluation value related to the common core line.

6. An information processing device comprising:
a memory configured to store instructions; and
a processor configured to execute instructions to:
extract a core line from an image containing dermatoglyphic pattern; and
identify an evaluation value indicating possibility of the dermatoglyphic pattern of the core line based on data size of compressed data of the image,
wherein the identification identifies the evaluation value for each of a plurality of local areas acquired by partitioning the image, and
wherein the identification identifies the evaluation value for each of the plurality of local areas based on data size of each of the plurality of local areas in compressed data of the image.

7. An information processing method comprising:
extracting a core line from an image containing dermatoglyphic pattern;
identifying an evaluation value indicating possibility of the dermatoglyphic pattern of the core line; and
correcting the image based on the evaluation value,
wherein the identification identifies the evaluation value for each of a plurality of local areas acquired by partitioning the image,
wherein the correction corrects the image for each unit of the plurality of local areas, and
wherein the identification identifies the evaluation value for each of the plurality of local areas based on data size of each of the plurality of local areas in compressed data of the image.

8. A non-transitory storage medium storing a program that causes a computer to perform:
extracting a core line from an image containing dermatoglyphic pattern;
identifying an evaluation value indicating possibility of the dermatoglyphic pattern of the core line; and
correcting the image based on the evaluation value,
wherein the identification identifies the evaluation value for each of a plurality of local areas acquired by partitioning the image,
wherein the correction corrects the image for each unit of the plurality of local areas, and
wherein the identification identifies the evaluation value for each of the plurality of local areas based on data size of each of the plurality of local areas in compressed data of the image.

* * * * *